United States Patent
Roh et al.

(10) Patent No.: US 8,238,406 B2
(45) Date of Patent: Aug. 7, 2012

(54) TIME-HOPPING SEQUENCE FOR BURST MODE COMMUNICATIONS

(75) Inventors: June Chul Roh, Allen, TX (US); Anuj Batra, Dallas, TX (US)

(73) Assignee: Texas Instruments Incorporated, Dallas, TX (US)

(\*) Notice: Subject to any disclaimer, the term of this patent is extended or adjusted under 35 U.S.C. 154(b) by 321 days.

(21) Appl. No.: 12/731,972

(22) Filed: Mar. 25, 2010

(65) Prior Publication Data

US 2010/0246639 A1 Sep. 30, 2010

Related U.S. Application Data

(60) Provisional application No. 61/163,310, filed on Mar. 25, 2009, provisional application No. 61/176,369, filed on May 7, 2009.

(51) Int. Cl.
*H04B 1/00* (2006.01)
(52) U.S. Cl. .......... 375/138; 375/141; 375/259
(58) Field of Classification Search .......... 375/138, 375/141, 259, 358
See application file for complete search history.

(56) References Cited

U.S. PATENT DOCUMENTS

2006/0003767 A1* 1/2006 Kim et al. .......... 455/436
2008/0144210 A1* 6/2008 Dougherty et al. .......... 360/77.02
2009/0327800 A1* 12/2009 Kim .......... 714/5

\* cited by examiner

*Primary Examiner* — Emmanuel Bayard
(74) *Attorney, Agent, or Firm* — Steven A. Shaw; W. James Brady; Frederick J. Telecky, Jr.

(57) ABSTRACT

A method consisting of determining, by a symbol mapper, whether a previous burst position is below a threshold, wherein the previous burst position defines a location within a previous symbol. A determination that the previous burst position is below the threshold causes generating, by the symbol mapper, a random number in a complete set, the random number defines a current burst position, the current burst position defines a location within a current symbol and sending or receiving a value in the current burst position. A determination that the previous burst position is above the threshold causes generating, by the symbol mapper, a random number in a reduced set, the random number defines a modified current burst position, the modified current burst position defines a location within the current symbol and sending or receiving a value in the modified current burst position.

32 Claims, 6 Drawing Sheets

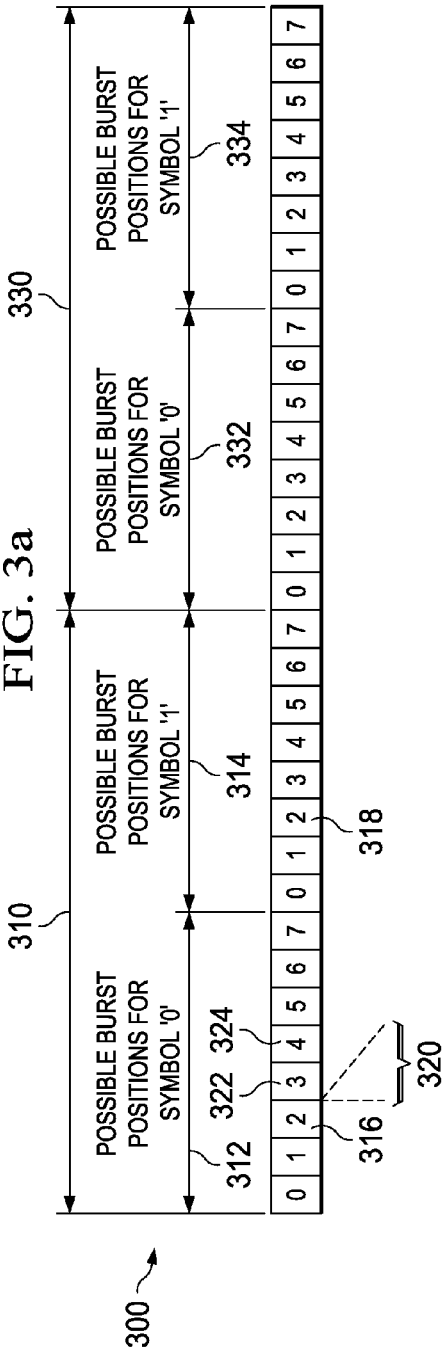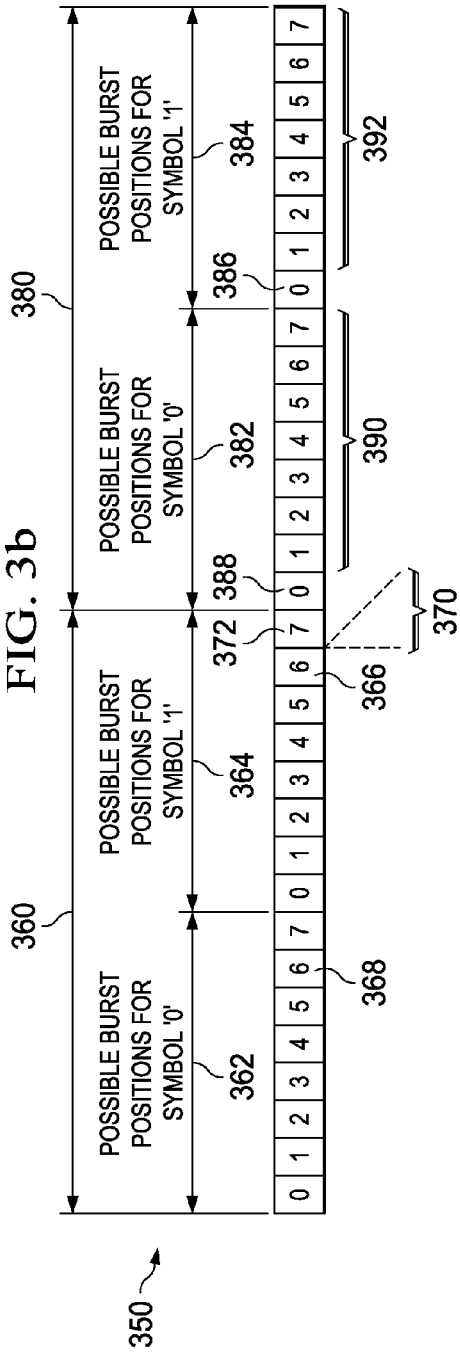

TIME-HOPPING SEQUENCE FOR BURST MODE COMMUNICATIONS

CROSS-REFERENCE TO RELATED APPLICATION

The present application claims priority to U.S. Provisional Patent Application No. 61/163,310, filed on Mar. 25, 2009 and U.S. Provisional Patent Application No. 61/176,369, filed on May 7, 2009, both of which are hereby incorporated herein by reference. U.S. patent application Ser. No. 12/702,628, filed on Feb. 9, 2010 and entitled "Ultra Wideband Modulation For Body Area Networks" may be related to the subject matter described herein.

BACKGROUND

Body area networks (BAN) are a low-power short-range wireless technology that can be used for medical applications, such as digital band-aids and pacemakers, and for entertainment and consumer electronics applications, including heads-up displays and wireless gaming. Body area networks are being designed for use in several radio frequency bands, including 400 MHz Medical Implant Communications Service ("MICS") band, 900 MHz and 2.4 GHz Industrial, Scientific and Medical ("ISM") band, and 3.1-10.6 GHz Ultra Wideband (UWB) band.

A symbol is a representation of a bit value, either 0 or 1, often used in wireless communications. The particular value represented by a symbol may be determined based on when a signal is transmitted by a device and when that signal energy is received by a device that is listening for signals. Symbols may be modulated, or made to appear to a receiving device as a 0 or a 1, in a multitude of ways. A transceiver, or a device capable of transmitting and receiving symbols, must agree with another transceiver on a modulation scheme in order for the two devices to communicate. In some modulation schemes, a symbol may be thought of as positions in which a signal may be transmitted. In these "pulse position modulation" schemes, transmission of a signal in one position may represent a '0' bit, whereas transmission in another position may represent a '1' bit.

A refinement of this scheme is to use multiple burst positions, as opposed to a single pulse position, to represent a bit. This scheme is called "burst position modulation." The multiple burst positions that replace a single pulse position represent a single bit value, and the receipt of signal energy in any of the multiple burst positions for a particular bit is interpreted as a transmission of that particular bit value. The burst position in which a signal is transmitted to represent a particular bit value may change from symbol to symbol. Changing, or hopping, the burst position from one symbol to the next in a deterministic way is called time-hopping. The hopping pattern is known to both the transmitter and the receiver. Such time-hopping mitigates interference from neighboring devices and serves to make the transmitted signal more random, which results in a flat spectrum (i.e., no spectral lines).

SUMMARY

The problems noted above are solved in large part by a method consisting of determining, by a symbol mapper, whether a previous burst position is below a threshold, wherein the previous burst position defines a location within a previous symbol. A determination that the previous burst position is below the threshold causes generating, by the symbol mapper, a random number in a complete set, the random number defines a current burst position and the current burst position defines a location within a current symbol and sending or receiving a value in the current burst position. A determination that the previous burst position is above the threshold causes generating, by the symbol mapper, a random number in a reduced set, the random number defines a modified current burst position and the modified current burst position defines a location within the current symbol and sending or receiving a value in the modified current burst position.

In accordance with at least some other embodiments, a system includes a symbol mapper configured to determine whether a previous burst position is below a threshold, wherein the previous burst position defines a location within a previous symbol. If the symbol mapper determines that the previous burst position is below the threshold then, as a result, the symbol mapper generates a random number in a complete set, the random number defines a current burst position and the current burst position defines a location within a current symbol and sends or receives a value in the current burst position. If the symbol mapper determines that the previous burst position is above the threshold then, as a result, the symbol mapper generates a random number in a reduced set, the random number defines a modified current burst position and the modified current burst position defines a location within the current symbol; and sends or receives a value in the modified current burst position.

In accordance with yet other embodiments, a body area network includes an impulse-radio ultra-wideband ("IR-UWB") transmitter and an IR-UWB receiver. The transmitter is configured to apply no guard interval periods per symbol transmitted. The receiver is configured to receive transmissions of the IR-UWB transmitter. A first symbol is transmitted without a guard interval and using a first burst position, a second symbol is transmitted without a guard interval and using a second burst position, the first symbol immediately precedes the second symbol and the difference between the first burst position and the second burst position is greater than a channel delay spread.

BRIEF DESCRIPTION OF THE DRAWINGS

For a detailed description of exemplary embodiments of the invention, reference will now be made to the accompanying drawings in which:

FIG. 3a shows a symbol structure for Pulse-Position Modulation ("PPM") in accordance with various embodiments;

FIG. 3b shows another symbol structure for PPM in accordance with various embodiments;

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless connection. In the detailed description and in the claims, the term "random number" comprises "pseudo-random number."

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
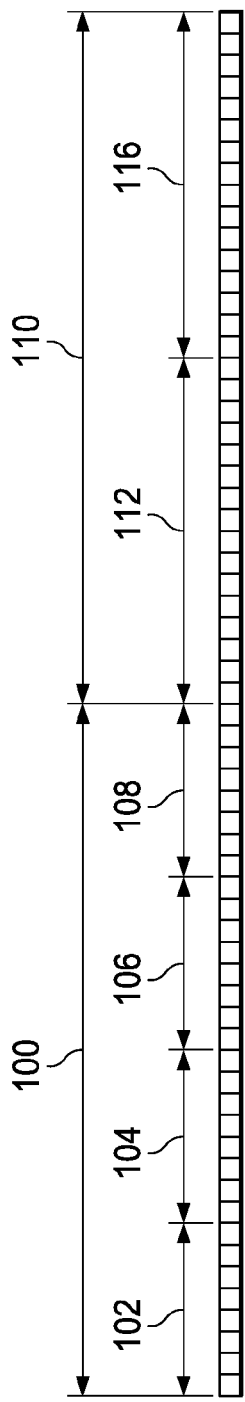
FIG. 1 shows an illustrative signal transmission scheme.

The IEEE 802.15.4a standard supports burst position modulation using non-coherent receivers such as energy-based detectors. Non-coherent receivers are able to detect the presence or absence of a signal but not the phase of the signal. FIG. 1 shows an illustrative signal transmission scheme using the IEEE 802.15.4a standard. The figure shows two symbol frames 100 and 110. In this exemplary modulation scheme, a '0' bit is indicated for symbol frame 100 by transmitting a signal in one of the burst positions 102, and for symbol frame 110 by transmitting a signal in one of the burst positions 112. A '1' bit is indicated for symbol frame 100 by transmitting a signal in one of the burst positions 106, and for symbol frame 110 by transmitting a signal in one of the burst positions 116. A transmitted signal takes a period of time to attenuate, or to become undetectable. This time period is referred to as channel delay spread (e.g., due to transmission of one signal along different paths, resulting in multiple receptions of the same signal, or multipaths in a wireless channel), and causes a receiving device to misinterpret the receipt of a signal (i.e., to determine that a signal has been received when, in fact, the receiving device is detecting energy from a previous signal that has not yet attenuated). This misinterpretation is referred to as inter-symbol interference.

To protect against such inter-symbol interference, a guard interval is used. In symbol frame 100, a guard interval 104 is inserted after the burst positions 102 that represent a '0' bit and another guard interval 108 is inserted after the burst positions 106 that represent a '1' bit. During guard intervals 104, 108, no signals are transmitted. This period of silence allows enough time so that any transmitted signal may attenuate, or become undetectable, before the next signal is expected.

For example, guard interval 104 prevents detection of signal energy from a '0' bit in any burst position 102 during the following burst positions 106 for a '1' bit. As a result, an energy-based detector would not mistake the transmission of a '0' bit for the transmission of a '1' bit. As another example, guard interval 108 prevents detection of signal energy from a '1' bit in any burst position 106 during the next symbol frame 110's burst positions 112 as a '0' bit. As a result, an energy-based detector would not mistake the transmission of a '1' bit in symbol frame 100 for the transmission of a '0' bit in symbol frame 110. However, guard intervals 104, 108 represent an overhead in the transmission scheme and reduce the channel efficiency (i.e., limits the maximum achievable data rate), since no information is transmitted during a guard interval.

In accordance with various embodiments, the guard intervals in the burst position modulation scheme are removed. An intelligent time-hopping sequence facilitates the removal of the guard intervals. The guard intervals are rendered unnecessary by ensuring that signal energy is transmitted only in burst positions where there is little to no risk of inter-symbol interference.

The physical layer ("PHY") portion of a transceiver operates to convert symbols (e.g., bits) to transmittable signals, and to convert received signals into symbols. PHY design should consider channel characteristics. Embodiments of the present disclosure include an impulse-radio ultra-wideband ("IR-UWB") PHY tailored for use with a body area network ("BAN").

Figure 2A:
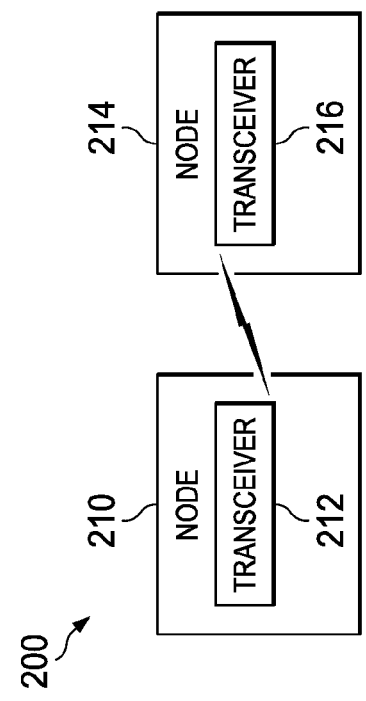
FIG. 2a shows a block diagram of an illustrative system in accordance with various embodiments.

FIG. 2a shows a representative BAN 200 in accordance with various embodiments. The BAN 200 includes one or more nodes 210, 214. Each node 210, 214 may include a sensor (e.g., motion, temperature, electrical activity sensor, etc.), a processor, an output device (e.g., audio or video transducers), etc. Each node 210, 214 includes a transceiver 212, 216 that communicatively couples the nodes 210, 214 to each other, or to one or more other nodes. Embodiments of the transceiver 212, 216 are configured for communication over relatively short distances applicable to the BAN 200. For example, the distance between nodes 210, 214 may be three meters or less in the BAN 200.

The transceivers 212, 216 include a PHY configured for use in the BAN 200. Embodiments of the PHY use pulse position modulation ("PPM"). Some embodiments use PPM in conjunction with a different modulation technique, such as on/off keying ("OOK"), phase shift keying ("PSK") or differential PSK. Some embodiments use PPM exclusively, which reduces implementation complexity when compared to embodiments using PPM in combination with another modulation technique. Some embodiments use one of OOK, PSK or differential PSK exclusively, which also reduces implementation complexity when compared to embodiments using OOK, PSK or differential PSK in combination with another modulation technique. Some embodiments of the PHY use a channel bandwidth of 499.2 mega-hertz ("MHz"), 512 MHz or 528 MHz, with center frequencies that enable a low-power transceiver architecture.

Embodiments of the PHY determine which burst positions of a symbol are suitable for transmitting a signal to avoid inter-symbol interference. No guard interval is used in the symbol period. By using this symbol structure, the number of bursts per symbol may be increased when compared to an embodiment allocating one or two guard intervals per symbol period, which results in enhanced interference mitigation. Alternatively, this symbol structure allows for an increase in data rate while maintaining the same burst length as an embodiment allocating one or two guard intervals per symbol period.

Figure 2B:
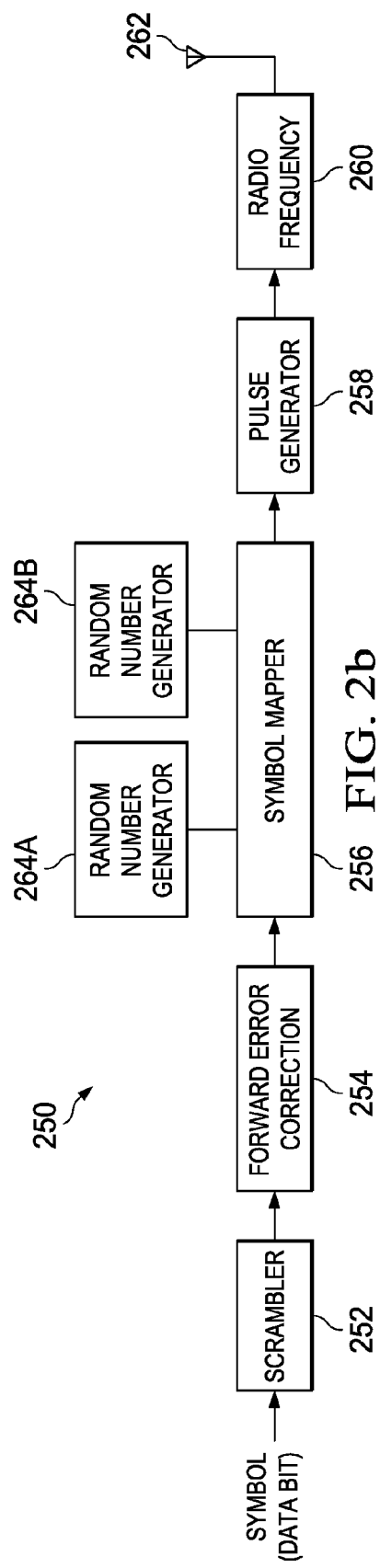
FIG. 2b shows another block diagram of an illustrative system in accordance with various embodiments.

FIG. 2b shows a block diagram for a PHY portion of an IR-UWB transmitter 250 in accordance with various embodiments. The PHY includes a scrambler 252, a forward error correction ("FEC") encoder 254, a symbol mapper 256, a pulse generator 258, radio frequency ("RF") circuitry 260, and an antenna 262. The scrambler 252 is a randomizing system used to eliminate long runs of identical symbols. The scrambler 252 may be implemented, for example, as either a side-stream scrambler (e.g., per IEEE 802.11a or ECMA-368) or a self-synchronizing scrambler (e.g., per IEEE 802.11b). The FEC encoder 254 adds redundancy to the transmitted symbols, thereby allowing a receiver to identify and correct channel induced errors in received data.

The symbol mapper 256 maps a scrambled or encoded input symbol to a signal representative of the symbol. Specifically, the symbol mapper 256 determines the position of the symbol in the time-domain and determines which burst positions of the symbol are suitable for transmitting a signal to avoid inter-symbol interference. The symbol mapper 256 does not generate a guard interval in the symbol transmission. The symbol mapper 256 also determines the time-hopping sequence applied to the symbol, and may use one or more random number generators ("RNG") 264 NB to determine the time-hopping sequence. As used herein, "symbol mapper" is used for simplicity and includes both the ability to convert a symbol to a signal in the case of a transmitter and the ability to convert a signal to a symbol in the case of a receiver.

Figure 2C:
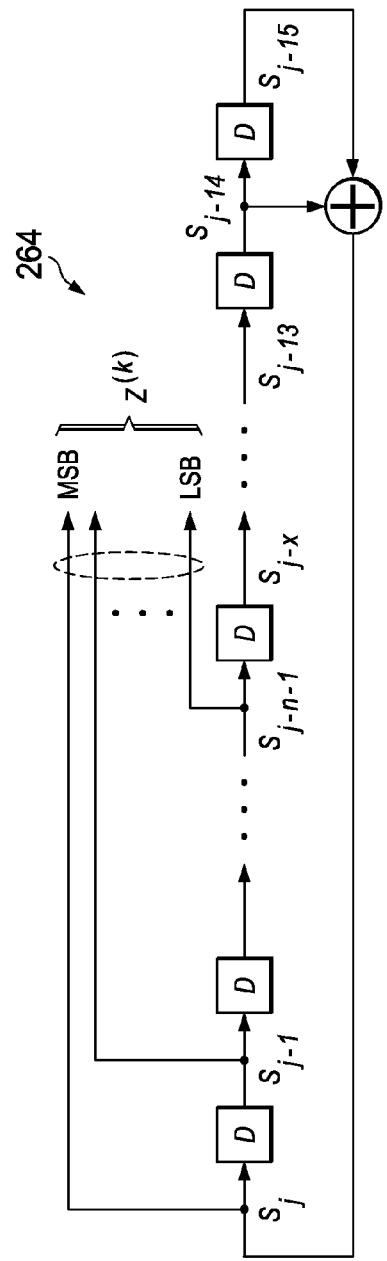
FIG. 2c shows an illustrative schematic diagram for a pseudo-random number generator.

The RNGs 264 may take the form of a linear shift feedback register, as shown in FIG. 2c. The random number may be generated by tapping multiple shift registers in the linear feedback shift register.

Referring back to FIG. 2b, the pulse generator 258 generates pulses at the time and with the polarities specified by the symbol mapper 256. In some embodiments, the pulse generator 258 generates pulses having a width of approximately 2 nano-seconds. In other embodiments, the pulse generator 258 generates pulses of a different width or other waveforms (e.g., a chirp). The RF circuitry 260 drives the output of the pulse generator 258 onto the antenna 262 for conversion from conducted to an airwave form. The scrambler 252, the FEC encoder 254, and the symbol mapper 256 may be implemented in the digital domain by dedicated circuitry, processors executing software programming, or a combination of the two. The pulse generator 258 can be implemented in either the analog or the digital domain, but in some embodiments, implementation in the analog domain is advantageous for power reasons.

FIG. 3a shows an example of two symbols 300 in accordance with various embodiments. A previous symbol 310 directly precedes a current symbol 330 in time. Each of the previous symbol 310 and the current symbol 330 comprise sixteen possible burst positions, with the first halves 312, 332 of each symbol representing '0' bits and the second halves 314, 334 of each symbol representing '1' bits. Each burst position comprises an index value, in this case {0, 1, 2, 3, 4, 5, 6, 7}. No guard interval is used in symbols 300. One skilled in the art would understand that symbols 300 may be of varying lengths and the order of bit transmission may vary.

The first transceiver 212 may use a symbol mapper 256 to generate a burst position for a particular bit value in the previous symbol 310. In some embodiments, an RNG 264 randomly generates an index value in the set {0, 1, 2, 3, 4, 5, 6, 7}. The set {0, 1, 2, 3, 4, 5, 6, 7} is complete because this set contains all possible burst positions within each half of each symbol. In an alternative embodiment where OOK or PSK (including differential PSK) modulation is used, the complete set is given by {0, 1, 2, 3, . . . , 15}. One skilled in the art would understand that this is a result of differences in the modulation scheme, whereby each symbol is not divided into halves, rather the symbol is viewed as a whole, and thus indices indicate position irrespective of bit value.

Assume in this case that the RNG 264 generates a value of 2. Thus, if the first transceiver 212 transmits a '0' bit value, the symbol mapper 256 determines that a signal is transmitted in burst position 316 (i.e., the burst position for a '0' bit having an index of 2). The second transceiver 216 may use a symbol mapper 256, which uses the same RNG 264 with the same seed as the first transceiver 212, to determine when to expect the signal. Thus, although the second transceiver 216 does know which burst positions may be used to transmit the signal, the second transceiver 216 does not know which bit value is being transmitted. The RNG 264 of the first transceiver 212 and the RNG 264 of the second transceiver 216 perform the same random number generation function so that the first transceiver 212 is sending a signal in one of the burst positions where the second transceiver 216 expects to detect a signal. Thus, in this example, the second transceiver 216 expects to detect a signal energy in burst position 316 or 318.

A channel delay spread is shown by interval 320. In this example, the channel has a channel delay spread equal to the duration of two burst positions. That is, when the signal is transmitted, signal energy may be detected by the second transceiver 216 during the burst position in which the signal is transmitted 316 as well as the following two burst positions (i.e., burst positions 322, 324). In this example, the transmitted signal attenuates after the time period corresponding to the channel delay spread 320, which is before the current symbol 330 is transmitted. Thus, a guard interval is not needed.

FIG. 3b shows an alternative embodiment of two symbols 350 in accordance with various embodiments. A previous symbol 360 directly precedes a current symbol 380 in time. As above, each of the previous symbol 360 and the current symbol 380 comprise sixteen possible burst positions, with the first halves 362, 382 of each symbol representing '0' bits and the second halves 364, 384 of each symbol representing '1' bits. Each burst position comprises an index value, in this case {0, 1, 2, 3, 4, 5, 6, 7}. The set {0, 1, 2, 3, 4, 5, 6, 7} is complete because this set contains all possible burst positions within each half of each symbol. As discussed above, if OOK or PSK (including differential PSK) modulation is used, the complete set is given by {0, 1, 2, 3, . . . , 15}. One skilled in the art would understand that the symbols 350 may be of varying lengths and the order of bit transmission may vary.

In this illustrative case, the first transceiver 212 transmits during the previous symbol 360 using the symbol mapper 256, which uses an RNG 264 to generate a value of 6. Thus, if the first transceiver 212 transmits a '1' bit value, the signal mapper 256 determines that a signal is transmitted in burst position 366 (i.e., the burst position for a '1' bit having an index of 6). The second transceiver 216 may use a symbol mapper 256, which uses the same RNG 264 with the same seed as the first transceiver 212, to determine when to expect the signal. Thus, although the second transceiver 216 does know which burst positions may be used to transmit the signal, the second transceiver 216 does not know which bit value is being transmitted. The RNG 264 of the first transceiver 212 and the RNG 264 of the second transceiver 216 perform the same random number generation function so that the first transceiver 212 is sending a signal in one of the burst positions where the second receiver 222 expects to detect a signal. Thus, in this example, the second transceiver 216 expects to detect a signal energy in burst position 366 or 368.

A channel delay spread is shown by interval 370. In this example, the channel has a channel delay spread equal to the duration of two burst positions. That is, when the signal is transmitted, signal energy may be detected during the burst position in which the signal is transmitted 366 as well as the following two burst positions (i.e., burst positions 372, 388). In this example, the transmitted signal does not completely attenuate before the current symbol 380 is transmitted (shown by channel delay spread 370).

Assume that the first transceiver 212 transmits a '1' bit value during the current symbol 380 using the symbol mapper 256, which uses an RNG 264 to generate a value of 0. Thus, the signal mapper 256 determines that a signal is transmitted in burst position 386 (i.e., the burst position for a '1' bit value having an index of 0). However, the second transceiver 216 using a symbol mapper 256, which uses the same RNG 264 with the same seed as the first transceiver 212, determines to expect the signal energy in either burst position 386 or 388 (i.e., burst positions having an index of 0). As a result, although the first transceiver 212 transmits in position 386, the second transceiver 216 will detect energy in both positions 388 (as a result of incomplete attenuation from the previous transmission in burst position 360, shown by channel delay spread 370) and 386 (as a result of the actual transmission). This causes confusion at the second transceiver 216. This phenomenon or error is avoided by the symbol mapper 256 limiting the generated index value to the reduced set $\{1, 2, 3, 4, 5, 6, 7\}$, because the transmitted signal attenuates, shown by channel delay spread 370, before the transmission of a signal in any one of the group 390 of burst positions (i.e., positions having an index in the set $\{1, 2, 3, 4, 5, 6, 7\}$). Thus, the second transceiver 216 using the reduced set determined by the symbol mapper 256 would only detect energy when the '1' bit signal was transmitted in any one of the group 392 of burst positions, resulting in no confusion.

In an exemplary embodiment, the symbol mapper 256 uses a modulo function to reduce the set. For example, using a modulus of 7 on the set $\{0, 1, 2, 3, 4, 5, 6, 7\}$ results in the reduced set $\{0, 1, 2, 3, 4, 5, 6, 0\}$ or, simplified, $\{0, 1, 2, 3, 4, 5, 6\}$. To obtain the desired set above, the symbol mapper 256 adds a value of 1 to the elements of the set, resulting in the reduced set $\{1, 2, 3, 4, 5, 6, 7\}$. This is a reduced set as all elements of the reduced set are contained in the complete set. If the signal was transmitted in burst position 372, having an index of 7, the desired reduced set to avoid inter-symbol interference is $\{2, 3, 4, 5, 6, 7\}$. The symbol mapper 256, using a modulus of 6 on the set $\{0, 1, 2, 3, 4, 5, 6, 7\}$, reduces the set to $\{0, 1, 2, 3, 4, 5, 0, 1\}$ or, simplified, $\{0, 1, 2, 3, 4, 5\}$. To obtain the desired set (i.e., to avoid inter-symbol interference for a burst position 372 having an index of 7), the symbol mapper 256 adds a value of 2 to the elements of the set, resulting in the reduced set $\{2, 3, 4, 5, 6, 7\}$. Once a reduced set is determined that eliminates inter-symbol interference, the current symbol is transmitted by transmitting a signal in one of the burst positions given by the reduced set.

Figure 4:
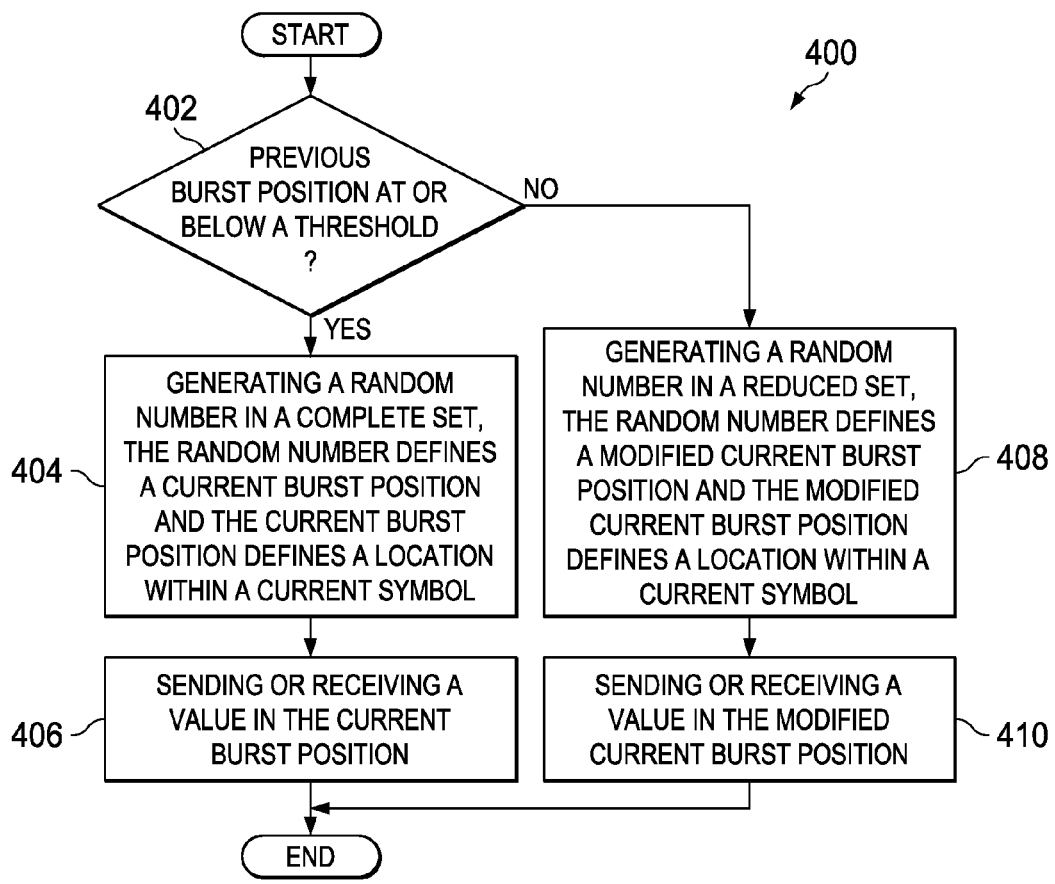
FIG. 4 shows a flow diagram of an illustrative method in accordance with various embodiments.

FIG. 4 shows a flow diagram of a method 400 in accordance with various embodiments. The method 400 begins with determining whether a previous burst position is less than or equal to a threshold (decision block 402). The threshold value is dependent on the expected maximum channel delay spread.

If the previous burst position is below a threshold, the method continues to generating a random number in a complete set, the random number defines a current burst position, and the current burst position defines a location within a current symbol (block 404). The random number is generated, for example, by a symbol mapper 256 using an RNG 264, for example a linear feedback shift register as shown in FIG. 2c. In some embodiments, the generated random number may be outside of the complete set, but is ensured to be in the complete set by utilizing the modulo function. For example, if the complete set is $\{0, 1, 2, 3, 4, 5, 6, 7\}$, using a modulus of 8 ensures that the random number exists in the complete set. In the above example, the set $\{0, 1, 2, 3, 4, 5, 6, 7\}$ is complete because this set contains all possible burst positions of the symbol. In an alternative embodiment where OOK or PSK (including differential PSK) modulation is used, the complete set is given by $\{0, 1, 2, 3, \ldots, 15\}$. One skilled in the art would understand that this is a result of differences in the modulation scheme, whereby each symbol is not divided into halves, rather the symbol is viewed as a whole, and thus indices indicate position irrespective of bit value. The method 400 then continues to sending or receiving a value in the current burst position (block 406) and ends.

If the previous burst position is above the threshold, the method continues to generating a random number in a reduced set, the random number defines a modified current burst position, and the modified current burst position defines a location within a current symbol (block 408).

In an exemplary embodiment, the random number is generated by a symbol mapper 256 using an RNG 264, for example a linear feedback shift register as shown in FIG. 2c. Furthermore, to ensure generation in a reduced set, the modulo function is used with a modulus of less than 8 and an offset is added to the elements of the resulting set. Thus, transmitting a signal in any index of the reduced set does not result in inter-symbol interference, despite the lack of a guard interval. The method 400 then continues to sending or receiving a value in the modified current burst position (block 410) and ends.

In the above example with a channel delay spread of 2, the threshold value may be 5. In other words, if the previous burst position was between 0 and 5, inclusive (i.e., at or below the threshold), then the current burst position may be any random number in the complete set. In this case, as in FIG. 3a, inter-symbol interference will not cause an error.

However, if the previous burst position was 6 or 7 (i.e., above the threshold), then the current burst position may not be 0 (if the previous burst position was 6 or 7) or 1 (if the previous burst position was 7). Thus, the random number must be generated in a reduced set to avoid inter-symbol interference. The reduced set where the previous burst position was 6 is $\{1, 2, 3, 4, 5, 6, 7\}$ and the reduced set where the previous burst position was 7 is $\{2, 3, 4, 5, 6, 7\}$. Limiting the current burst position to the reduced set avoids inter-symbol interference.

To further explain the above concepts, the formulas that follow use the variables defined below:

$T_s$: symbol duration $T_{burst}$ burst duration $N_{burst}$: the number of bursts in a symbol, i.e., $T_s = N_{burst} T_{burst}$ $h_k \in \{0, 1, \ldots N_{hop}-1\}$ time-hopping sequence for the k-th symbol, $k=0, 1, \ldots N_{sym}-1$.

$\tau_{max}$: expected maximum delay spread of channel $$N_{ch} = \left\lceil \frac{\tau_{max}}{T_{burst}} \right\rceil.$$

Note that the channel delay spread, in general, can be larger than the burst length.

$N_{burst}$ is related to $N_{hop}$ as follows:

$$N_{burst} = \begin{cases} 2N_{hop}, \\ N_{hop}, \end{cases}$$

in PPM case
in OOK or PSK case. (1)

Figure 5A:
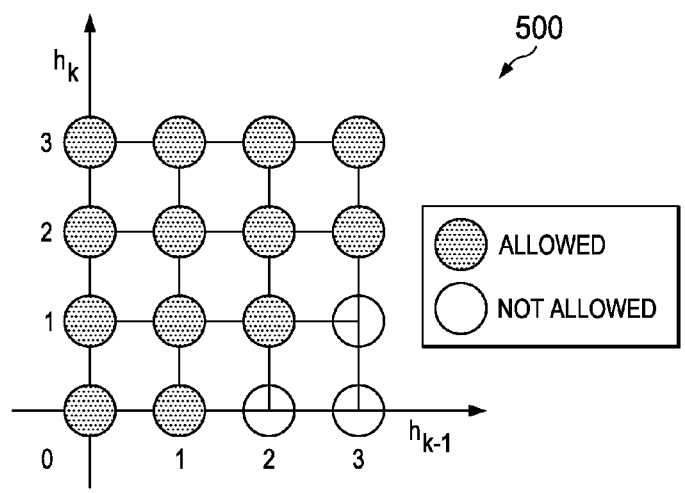
FIG. 5a shows an illustrative solution in accordance with various embodiments.

FIG. 5a shows an additional example of an illustrative solution 500 for an example set of parameters, in particular, the range of possible integer values that $h_k$ can take as a function of $h_{k-1}$ for the constraints $N_{hop}=4$ and $N_{ch}=2$.

Figure 5B:
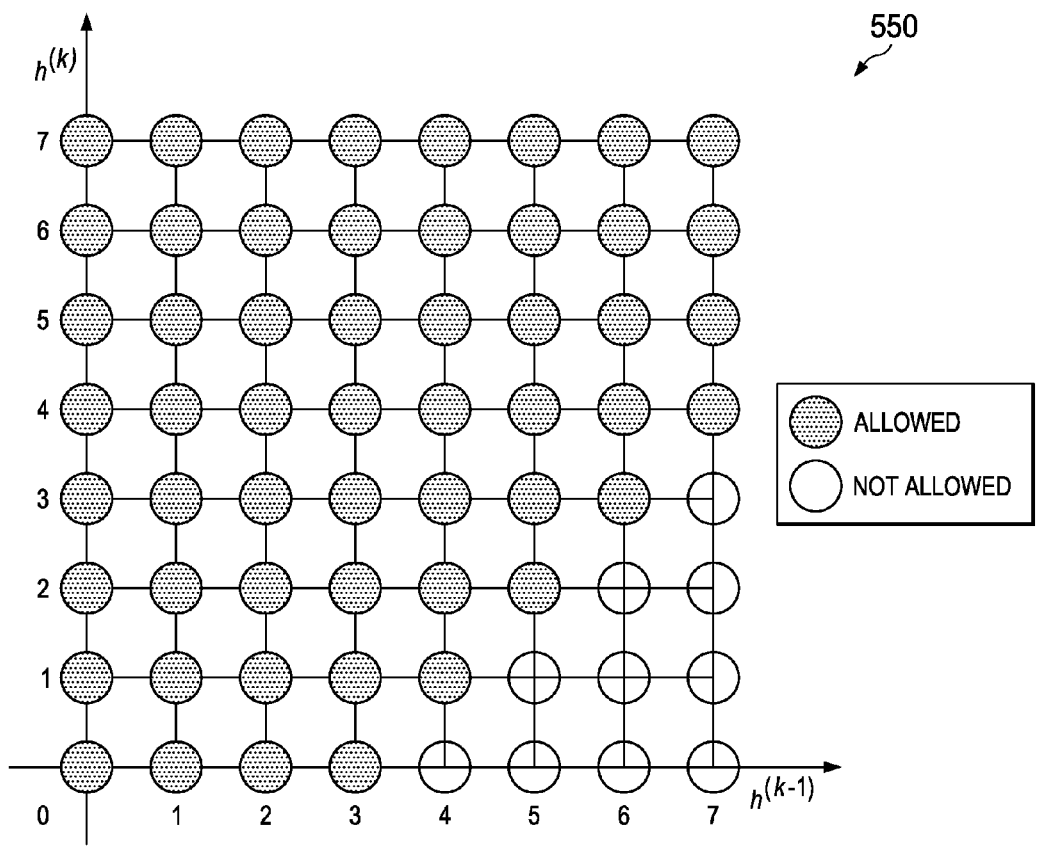
FIG. 5b shows another illustrative solution in accordance with various embodiments.

FIG. 5b shows another additional example of an illustrative solution 550 for an example set of parameters, in particular, the range of possible integer values that $h_k$ can take as a function of $h_{k-1}$ for the constraints $N_{hop}=8$ and $N_{ch}=4$.

In accordance with various embodiments, the burst position for bit $b_k \in \{0,1\}$ is given by $$(N_{burst} - N_{hop})b_k + h_k \quad (2)$$

where the subscript k indicates the symbol index.

Figure 6:
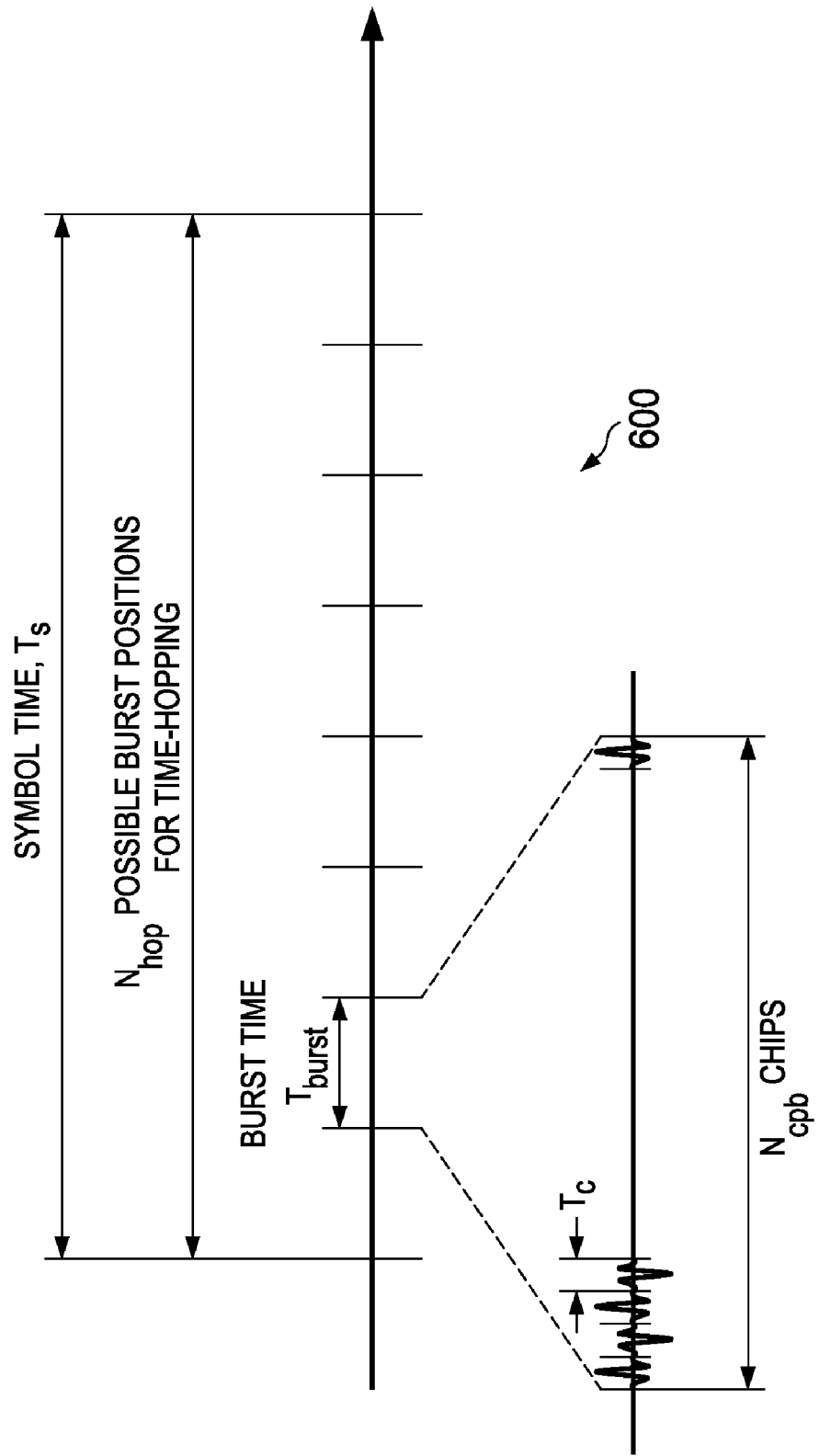
FIG. 6 shows a symbol structure for On/Off Key ("OOK") or Phase-Shift Keying ("PSK") modulation (including differential PSK modulation) in accordance with various embodiments.

In the PPM case where $N_{burst}$ is twice the value of $N_{hop}$, the bit value acts as an offset to the index. FIG. 6 shows a symbol 600 using OOK or PSK (including differential PSK) modulation where $N_{burst}$ is equal to $N_{hop}$. One having skill in the art would understand that the relation between $N_{burst}$ and $N_{hop}$ that is given in equation (1) may be applied to equation (2), such that equation (2) applies to both PPM and OOK or PSK (including differential PSK) modulation.

As explained above with respect to FIG. 3b, to avoid inter-symbol interference, the distance between the burst position of the previous symbol and the burst position of the current symbol must be greater than $N_{ch}$, or equivalently:

$$[N_{burst} + (N_{burst} - N_{hop})b_k + h_k] - [(N_{burst} - N_{hop})b_{k-1} + h_{k-1}] \geq N_{ch} + 1 \quad (3)$$

As shown above in FIG. 3b, the worst-case inter-symbol interference occurs when $b_{k-1}=1$ and $b_k=0$ (i.e., when the two groups of possible burst positions are adjacent to one another). Substituting $b_{k-1}=1$ and $b_k=0$ into equation (3) and simplifying gives the following criterion to ensure that there is no inter-symbol interference:

$$h_k + N_{hop} - h_{k-1} \geq N_{ch} + 1 \quad (4)$$

or $$h_k \geq h_{k-1} - (N_{hop} - N_{ch} - 1) \text{ for } k \geq 1. \quad (5)$$

The constraint given in equation (5) also ensures that there is no inter-symbol interference for the OOK and PSK (including differential PSK) modulation cases.

In accordance with various embodiments, a random time-hopping sequence $h_k \in \{0, 1, \ldots, N_{hop}-1\}$ that satisfies the constraint shown in equation (5) is provided. The following solutions are possible solutions for a time-hopping sequence that eliminate inter-symbol interference. The following solutions provide for a uniform probability density both when selecting an element from the complete set (given by $z_k$) and when selecting an element from the reduced set. However, it should be understood by one skilled in the art that other solutions may equivalently satisfy the constraint shown in equation (5).

The following solutions assume that $z_k \in \{0, 1, \ldots, N_{hop}-1\}$, and may be the output of an RNG 264, for example a linear feedback shift register. The random number $z_k$ may be generated by tapping multiple shift registers in a linear feedback shift register (usually $N_{hop}=2^m$ for some integer m, in which case the random number $z_k$ can be generated by tapping m shift registers in a linear feedback shift register).

In a first solution, the time-hopping sequence may be generated as follows:

$$h_k = \begin{cases} z_k, & \text{if } h_{k-1} \leq \gamma \\ [(z_k + k) \bmod N'_{hop}] + \alpha, & \text{if } h_{k-1} > \gamma \end{cases} \quad (6)$$

where k is the symbol index, $\gamma = N_{hop} - N_{ch} - 1$, $\alpha = h_{k-1} - \gamma$, and $N'_{hop} = N_{hop} - \alpha$. In other words, if $h_{k-1}$ is at or below a threshold, which is an index value that guarantees there will be no inter-symbol interference, then $h_k$ may be any random number $z_k \in \{0, 1, \ldots, N_{hop}-1\}$ (i.e., generating in a reduced set is not necessary). However, if $h_{k-1}$ is above the threshold, then $h_k$ must be mapped to a reduced set such that there will be no inter-symbol interference. By using the modulo function to reduce the set size and adding an offset α that is a function of $h_{k-1}$, such a condition is satisfied. One skilled in the art would understand that an adjustment of the threshold value may alter the inequalities used to compare $h_{k-1}$. For example, if the threshold was increased by 1, the conditions of the inequalities would shift to below (i.e., less than) and at or above (i.e., greater than or equal to). Additionally, in some embodiments, $h_{k-1}$ being at the threshold may cause the random number to be in a complete set and in other embodiments, $h_{k-1}$ being at the threshold may cause the random number to be in a reduced set.

In a second solution, the time-hopping sequence may be generated as follows:

$$h_k = \begin{cases} z_k, & \text{if } h_{k-1} \leq \gamma \\ [(z_k + c_k) \bmod N'_{hop}] + \alpha, & \text{if } h_{k-1} > \gamma \end{cases} \quad (7)$$

where $\gamma = N_{hop} - N_{ch} - 1$, $\alpha = h_{k-1} - \gamma$, $N'_{hop} = N_{hop} - \alpha$; and $c_k$ is a p-bit counter (cycles through $0, 1, \ldots, 2^p - 1$) where typically $p \geq m$. For example, $p=7$ when $N_{hop}=16$; $p=6$ when $N_{hop}=8$. This solution is similar to the first solution, but rather than adding the symbol index k to the generated random number, a cycling counter value is used where the number of digits in the counter is greater than or equal to the number of possible generated random numbers.

In a third solution, the time-hopping sequence may be generated as follows:

$$h_k = \begin{cases} z_k, & \text{if } h_{k-1} \leq \gamma \\ [k \bmod N'_{hop}] + \alpha, & \text{if } h_{k-1} > \gamma \end{cases} \quad (8)$$

where k is the symbol index, $\gamma = N_{hop} - N_{ch} - 1$, $\alpha = h_{k-1} - \gamma$, and $N'_{hop} = N_{hop} - \alpha$. This solution is also similar to the first solution, but rather than adding k to the generated random number, it is k that is used in the modulo function. The value of k will generally grow to a large number, and one skilled in the art would understand that taking the modulus of a large number produces results similar to taking the modulus of a random number.

In a fourth solution, the time-hopping sequence may be generated as follows:

$$h_k = \begin{cases} z_k, & \text{if } h_{k-1} \leq \gamma \\ c_l + \alpha, & \text{if } h_{k-1} > \gamma \end{cases} \quad (9)$$

where k is the symbol index, $c_l=[(c_{l-1}+1) \mod N'_{hop}]$ is a modulo counter that cycles between $0, 1, \ldots, N'_{hop}$ and is increment only when $h_{k-1} > \gamma$; $\gamma = N_{hop} - N_{ch} - 1$, $\alpha = h_{k-1} - \gamma$, and $N'_{hop} = N_{hop} - \alpha$. This solution is similar to the third solution, but rather than incrementing the counter k every symbol, the modulo counter is only incremented when it is utilized to generate a value for $h_k$.

The fifth solution utilizes an additional random number, $y_k \in \{0, 1, \ldots, N_{hop}-1\}$. This variable is the output of a different RNG (e.g., RNG 264B, where $z_k$ is generated using RNG 264A), for example a linear feedback shift register, or may be created from a different set of registers of the linear feedback shift register that is used to generate $z_k$. In the fifth solution, the time-hopping sequence may be generated as follows:

$$h_k = \begin{cases} z_k, & \text{if } h_{k-1} \leq \gamma \\ [y_k \mod N'_{hop}] + \alpha, & \text{if } h_{k-1} > \gamma \end{cases} \quad (10)$$

where k is the symbol index, $\gamma = N_{hop} - N_{ch} - 1$, $\alpha = h_{k-1} - \gamma$, and $N'_{hop} = N_{hop} - \alpha$.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   determining, by a symbol mapper, whether a previous burst position is below a threshold, wherein the previous burst position defines a location within a previous symbol;
   wherein a determination that the previous burst position is below the threshold causes:
      generating, by the symbol mapper, a random number in a complete set, the random number defines a current burst position and the current burst position defines a location within a current symbol; and
      sending or receiving a value in the current burst position; and
   wherein a determination that the previous burst position is above the threshold causes:
      generating, by the symbol mapper, a random number in a reduced set, the random number defines a modified current burst position and the modified current burst position defines a location within the current symbol; and
      sending or receiving a value in the modified current burst position.

2. The method of claim 1 wherein sending or receiving the value further comprises sending or receiving the value without using a guard interval.

3. The method of claim 2 wherein sending or receiving the value further comprises sending or receiving the value using pulse-position modulation.

4. The method of claim 2 wherein sending or receiving the value further comprises sending or receiving the value using on-off keying modulation.

5. The method of claim 2 wherein sending or receiving the value further comprises sending or receiving the value using phase-shift keying modulation.

6. The method of claim 1 wherein generating the random number in the reduced set further comprises using a modulus of a sum of a random number in a complete set and a counter as the random number.

7. The method of claim 1 wherein generating the random number in the reduced set further comprises using a modulus of a symbol index as the random number.

8. The method of claim 1 wherein generating the random number in the reduced set further comprises using a modulo counter value as the random number.

9. The method of claim 1 wherein:
   generating the random number in the complete set further comprises generating a random number using a first random number generator; and
   wherein generating the random number in the reduced set further comprises generating a random number using a second random number generator.

10. The method of claim 1 wherein determining whether the previous burst position is below the threshold further comprises determining that the previous burst position is below the threshold if the location of the previous burst position was in a first half of the previous symbol.

11. The method of claim 1 wherein the threshold is a function of a channel delay spread.

12. The method of claim 11 wherein determining whether the previous burst position is below the threshold further comprises determining that the previous burst position is above the threshold if the difference between the previous burst position and the current burst position is less than the channel delay spread.

13. The method of claim 11 wherein generating the random number in the reduced set further comprises mapping the random number to a set having elements such that the difference between the previous burst position and the modified current burst position is greater than the channel delay spread.

14. The method of claim 1 wherein at least one of generating the random number in the complete set and generating the random number in the reduced set further comprises using the out put of a linear feedback shift register.

15. The method of claim 14 wherein at least one of generating the random number in the complete set and generating the random number in the reduced set further comprises using the modulus of the output of the linear feedback shift register.

16. A system comprising:
   a symbol mapper configured to:
      determine whether a previous burst position is below a threshold, wherein the previous burst position defines a location within a previous symbol;
      wherein if the symbol mapper determines that the previous burst position is below the threshold then, as a result, the symbol mapper:
         generates a random number in a complete set, the random number defines a current burst position and the current burst position defines a location within a current symbol; and
         sends or receives a value in the current burst position; and
      wherein if the symbol mapper determines that the previous burst position is above the threshold then, as a result, the symbol mapper:

generates a random number in a reduced set, the random number defines a modified current burst position and the modified current burst position defines a location within the current symbol; and sends or receives a value in the modified current burst position.

17. The system of claim 16 wherein if the symbol mapper sends or receives the value, then the symbol mapper sends or receives the value and does not use a guard interval.

18. The system of claim 17 wherein if the symbol mapper sends or receives the value, then the symbol mapper uses pulse-position modulation to send or receive the value.

19. The system of claim 17 wherein if the symbol mapper sends or receives the value, then the symbol mapper uses on-off keying modulation to send or receive the value.

20. The system of claim 17 wherein if the symbol mapper sends or receives the value, then the symbol mapper uses phase-shift keying modulation to send or receive the value.

21. The system of claim 16 wherein if the symbol mapper generates a random number in a complete set, then the symbol mapper uses a modulus of a sum of a random number in a complete set and a counter as the random number.

22. The system of claim 16 wherein if the symbol mapper generates a random number in a complete set, then the symbol mapper uses a modulus of a symbol index as the random number.

23. The system of claim 16 wherein if the symbol mapper generates a random number in a complete set, then the symbol mapper uses a modulo counter value as the random number.

24. The system of claim 16 wherein:
if the symbol mapper generates the random number in the complete set, then the symbol mapper generates the random number using a first random number generator; and
if the symbol mapper generates the random number in the reduced set, then the symbol mapper generates the second random number using a second random number generator.

25. The system of claim 16 wherein the symbol mapper determines that the previous burst position is below the threshold if the location of the previous burst position was in a first half of the previous symbol.

26. The system of claim 16 wherein the threshold is a function of a channel delay spread.

27. The system of claim 26 wherein the symbol mapper determines that the previous burst position is above the threshold if the difference between the previous burst position and the current burst position is less than the channel delay spread.

28. The system of claim 26 wherein the reduced set comprises elements such that the difference between the previous burst position and the modified current burst position is greater than the channel delay spread.

29. The system of claim 16 wherein at least one of the symbol mapper generates a random number in a complete set and the symbol mapper generates a random number in a reduced set further comprises the symbol mapper uses the output of a linear feedback shift register.

30. The system of claim 29 wherein at least one of the symbol mapper generates the random number in a complete set and the symbol mapper generates the random number in a reduced set further comprises the symbol mapper uses the modulus of the output of the linear feedback shift register.

31. A body area network, comprising:
an impulse-radio ultra-wideband ("IR-UWB") transmitter configured to apply no guard interval periods per symbol transmitted; and
an IR-UWB receiver configured to receive transmissions of the ultra-wideband impulse-radio transmitter;
wherein:
a first symbol is transmitted without a guard interval and using a first burst position;
a second symbol is transmitted without a guard interval and using a second burst position;
the first symbol immediately precedes the second symbol; and
the difference between the first burst position and the second burst position is greater than a channel delay spread.

32. The body area network of claim 31 wherein the IR-UWB transmitter is further configured to apply at least one selected from the group consisting of: burst position modulation per symbol transmitted, on/off keying modulation per symbol transmitted and pulse-shift keying modulation per symbol transmitted.

* * * * *